(12) United States Patent
Vinokour et al.

(10) Patent No.: US 7,738,375 B1
(45) Date of Patent: Jun. 15, 2010

(54) SHARED SHAPING OF NETWORK TRAFFIC

(75) Inventors: Vitali Vinokour, Arlington, MA (US); Shawn Gallagher, Chelmsford, MA (US); Daniel K. Siu, Westford, MA (US); Thomas Lemaire, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 681 days.

(21) Appl. No.: 11/206,786

(22) Filed: Aug. 19, 2005

(51) Int. Cl.
*H04L 12/56* (2006.01)

(52) U.S. Cl. .................. 370/232; 370/233; 370/468; 370/395.1

(58) Field of Classification Search .......... 370/395, 370/397, 230, 392, 432, 236, 235, 232, 395.1, 370/468, 233; 709/224; 455/453, 452
See application file for complete search history.

(56) References Cited

U.S. PATENT DOCUMENTS

| | | | | |
|---|---|---|---|---|
| 6,064,651 A | * | 5/2000 | Rogers et al. | 370/233 |
| 6,104,698 A | * | 8/2000 | Fan et al. | 370/232 |
| 6,438,138 B1 | * | 8/2002 | Kamiya | 370/468 |
| 6,549,517 B1 | * | 4/2003 | Aweya et al. | 370/236.1 |
| 6,636,512 B1 | * | 10/2003 | Lorrain et al. | 370/392 |
| 6,687,225 B1 | * | 2/2004 | Kawarai et al. | 370/230.1 |
| 6,973,315 B1 | * | 12/2005 | Miernik et al. | 455/452.2 |
| 7,039,013 B2 | * | 5/2006 | Ruutu et al. | 370/235 |
| 2002/0110139 A1 | * | 8/2002 | Boura et al. | 370/432 |
| 2002/0114334 A1 | * | 8/2002 | Yang | 370/395.1 |
| 2004/0081093 A1 | * | 4/2004 | Haddock et al. | 370/230 |
| 2004/0085964 A1 | * | 5/2004 | Vaananen | 370/395.4 |
| 2004/0114520 A1 | * | 6/2004 | Davis | 370/236.1 |
| 2005/0044206 A1 | * | 2/2005 | Johansson et al. | 709/224 |
| 2006/0014544 A1 | * | 1/2006 | Tolli | 455/453 |
| 2006/0018326 A1 | * | 1/2006 | Yucel | 370/397 |
| 2006/0164989 A1 | * | 7/2006 | Hart et al. | 370/235 |

* cited by examiner

*Primary Examiner*—Kwang B Yao
*Assistant Examiner*—Syed Bokhari
(74) *Attorney, Agent, or Firm*—Harrity & Harrity, LLP

(57) ABSTRACT

A method for sharing an aggregate bandwidth among a group of traffic classes may include allocating a portion of the aggregate bandwidth to one of the group of traffic classes having a first priority associated therewith, where the allocated portion is referred to as a first bandwidth. The method may include allocating an unused portion of the aggregate bandwidth to a second one of the group of traffic classes having a second priority associated therewith in conjunction with a parameter associated with a downstream device.

20 Claims, 3 Drawing Sheets ion, explain the invention. In the drawings,
SHARED SHAPING OF NETWORK TRAFFIC

TECHNICAL FIELD

Implementations consistent with the principles of the invention relate generally to network communication and, more particularly, to sharing bandwidth among different priorities or classes of network traffic.

BACKGROUND

Service providers may configure networks to deliver network traffic over a path having a bandwidth. Service providers may want to configure networks to efficiently use the available bandwidth to meet the needs of their subscribers. For example, a subscriber may send different types, or classes, of traffic across a network, such as voice traffic, video traffic and/or data traffic. The subscriber may require that various classes of traffic be handled differently. In the above example, voice traffic may be prone to distortion when delayed between a sending device and a receiving device. In contrast, data traffic may be relatively insensitive to delay. As a result, a subscriber may wish to have voice traffic treated with a higher priority as compared to data traffic.

Service providers may configure networks to treat classes of traffic according to differing delivery requirements to facilitate efficient utilization of bandwidth. For example, service providers may configure networks to assign a best effort or a lower priority to data traffic and a higher priority to time-sensitive traffic, such as voice and/or video traffic.

Service providers may configure network devices to facilitate efficient traffic management in networks. For example, a network device may be configured to implement a scheduler to schedule the forwarding of traffic via logical interfaces according to the traffic's associated priority. A logical interface may be, for example, a virtual circuit (VC). The service provider may allocate bandwidth on the logical interface based on an anticipated volume for each class of traffic, such as, for example, voice, video, and/or data classes. A scheduler may try to shape traffic so as to ensure that no traffic class exceeds its portion of the overall bandwidth for the VC. This type of traffic shaping may cause the allocated bandwidth to be underutilized if a class of traffic, such as voice, is operating below its allocated threshold.

SUMMARY OF THE INVENTION

In accordance with an implementation, a method for sharing an aggregate bandwidth among a group of traffic classes is provided. The method may include allocating a portion of the aggregate bandwidth to one of the group of traffic classes having a first priority associated therewith, where the allocated portion is referred to as a first bandwidth. The method may include allocating an unused portion of the aggregate bandwidth to a second one of the group of traffic classes having a second priority associated therewith in conjunction with a parameter associated with a downstream device.

In accordance with another implementation, a device for implementing shared shaping is provided. The device may include a processor adapted to determine a new best effort rate value in association with rate information associated with a group of traffic classes, a best effort rate value, and a shared shaping rate. The processor may be adapted to shape an aggregate traffic flow that includes the group of traffic classes, where shaping the aggregate traffic flow operates to discourage exceeding a rate limit.

In accordance with yet another implementation, a device for shared shaping is provided. The device may include means for storing information about a group of traffic classes, a prior downstream queue length approximation, and a prior best effort rate value. The shared shaper may include means for shaping an aggregate traffic flow that includes the group of traffic classes based at least in part on the new best effort rate, where the shaped aggregate traffic flow is adapted to discourage overrunning a downstream queue.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Exemplary System

Figure 1:
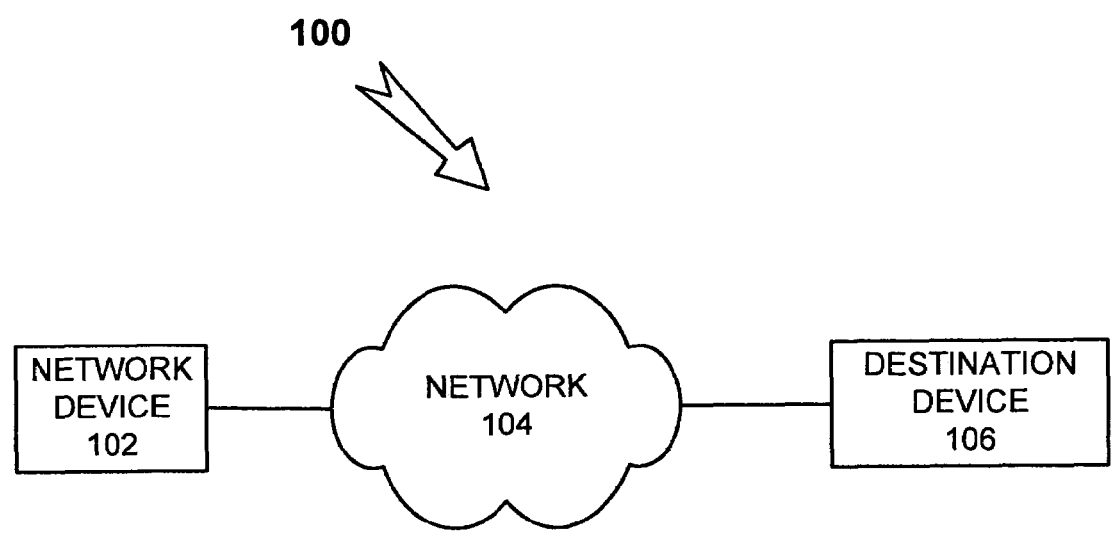
FIG. 1 illustrates an exemplary system that may be used to implement simple shared shaping consistent with principles of the invention.

FIG. 1 illustrates an exemplary system that may be used to implement simple shared shaping consistent with principles of the invention. System 100 may include a network device 102, a network 104 and a destination device 106. Network device 102 may be connected to other devices and may include any device capable of placing data units on a network. For example, network device 102 may include a device, such as a router, a switch, a server, a personal computer, an intrusion detection device, and/or a firewall. "Data unit," as used herein, may refer to any type of machine-readable data having substantially any format that may be adapted for use with network 104. For example, a data unit may include packet and/or non-packet formats.

Network device 102 may receive incoming data units from network 104 and/or another device and may make outgoing data units available to network 104 via an interface. Network device 102 may be configured to perform data unit operations and/or functions such as scheduling, forwarding, and/or switching.

Network 104 may include any type of network capable of receiving a data unit. Network 104 may include a number of network devices, such as routers, switches, gateways and/or databases, for transporting data units from a source device, such as network device 102, to a destination device, such as destination device 106. Network 104 may include physical links for transporting data units from a source to a destination. Physical links may include wired and/or wireless links and/or may include one or more logical interfaces, such as virtual circuits. Network 104 may operate via substantially any network protocol or combination of network protocols, such as Internet Protocol (IP), asynchronous transfer mode (ATM), and/or synchronous optical transport (SONET).

Destination device 106 may include any device capable of receiving a data unit from network 104 and/or transmitting a data unit to network 104. Destination device 106 may include a network device, such as a device similar to network device 102, a desktop computer, a server, a laptop computer, and/or a handheld computing device, such as a personal digital assistant (PDA) and/or web-enabled cellular telephone.

Exemplary Architecture

Figure 2:
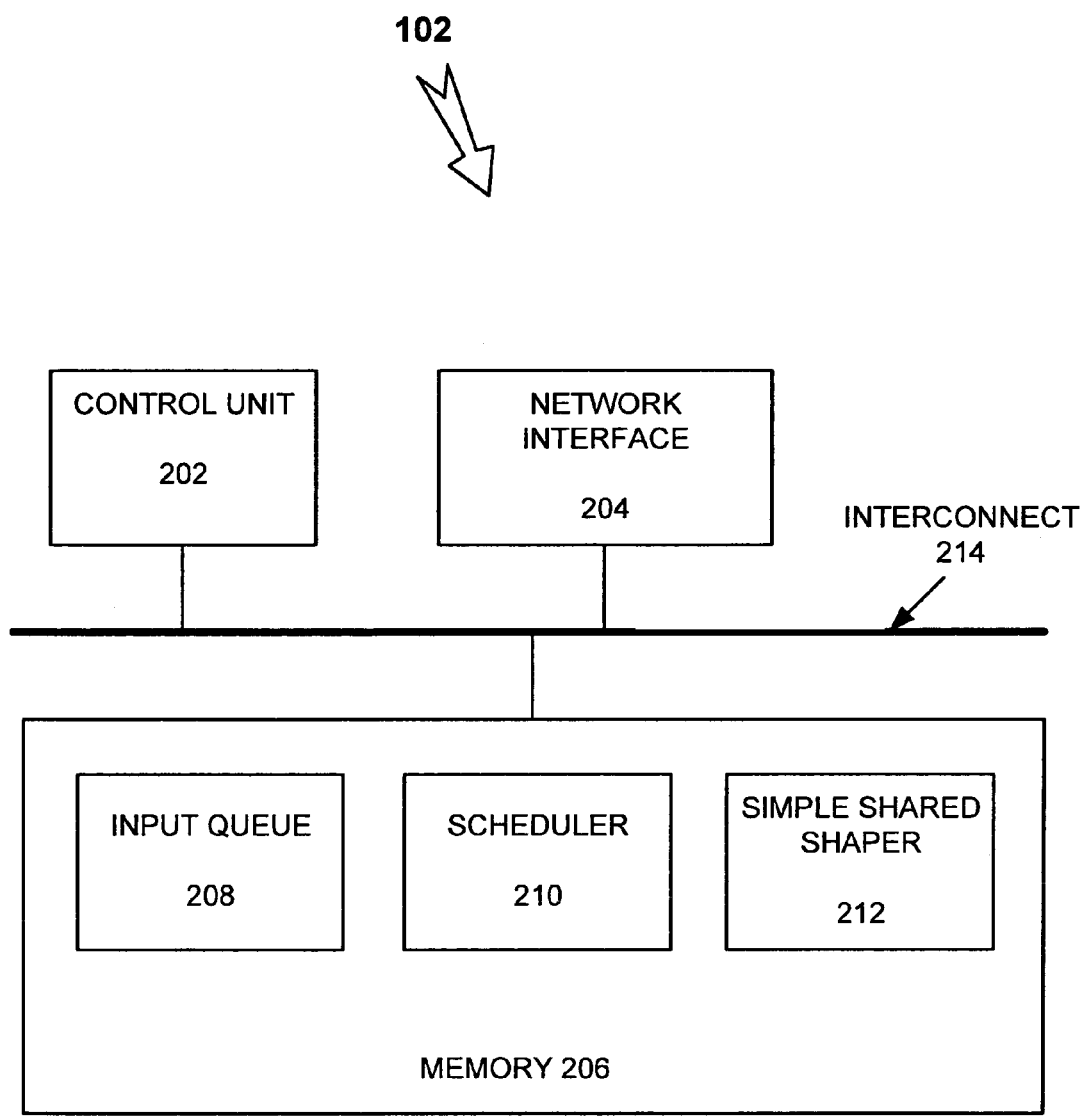
FIG. 2 illustrates an exemplary architecture that may be used in the network device of FIG. 1 to facilitate simple shared shaping consistent with the principles of the invention.

FIG. 2 illustrates an exemplary architecture that may be used in network device 102 to facilitate simple shared shaping consistent with the principles of the invention. The implementation of FIG. 2 may include a control unit 202, a network interface 204, a memory 206 that may include an input queue 208, a scheduler 210, and a simple shared shaper 212, and an interconnect 214.

Control unit 202 may include any type of processor, or microprocessor, or processing logic that interprets and executes instructions. Control unit 202 may be implemented in a standalone and/or a distributed configuration, such as in a parallel processing implementation. Control unit 202 may be implemented as an application specific integrated circuit (ASIC) consistent with the principles of the invention. Control unit 202 may perform high level management functions for network device 102, such as creating data unit forwarding lists, processing simple shared shaper inputs, interacting with scheduler 210, and/or monitoring the status of input queue 208.

Network interface 204 may include any device capable of receiving data units from and/or making data units available to network 104. For example, network interface 204 may receive a data unit from a physical link and may make the data unit available to control unit 202 for processing. Network interface 204 may receive the processed data unit and/or another data unit from control unit 202 and may make the processed data unit available to a physical link associated with network 104. A physical link may include one or more logical interfaces, such as virtual circuits, which may include a group of virtual circuits. A physical link may also include one or more virtual paths. Data units received via network interface 204 may be processed and shaped before network interface 204 makes them available to a link.

Memory 206 may include any device capable of storing information and/or instructions. For example, memory 206 may include a random access memory (RAM) or another type of dynamic storage device that stores information and instructions for execution by control unit 202. Memory 206 may also be used to store temporary variables and/or other intermediate information during execution of instructions by control unit 202. In addition, memory 206 may store incoming data units and/or outgoing data units. Memory 206 may operate in cooperation with other storage devices, such as a magnetic disk or optical storage media and its corresponding drive, for storing information and/or instructions. For example, memory 206 may store instructions that are used to process incoming traffic, information associated with incoming traffic, processed traffic, and queued outgoing traffic prior to making it available to network interface 204.

Input queue 208 may include hardware and/or software for monitoring and/or buffering data traffic flows within network device 102. For example, input queue 208 may include one or more queues for buffering voice traffic, video traffic and/or data traffic. Input queue 208 may operate in conjunction with memory 206. Input queue 208 may operate in conjunction with one or more determined traffic parameters, such as delay and/or jitter. For example, a first input queue associated with voice traffic may operate as a high priority queue according to stringent delay and/or jitter requirements, a second queue associated with video traffic may operate as a medium priority queue with less stringent delay and/or jitter requirements, and a third queue associated with data traffic may operate as a low priority queue having a best effort requirement.

Input queue 208 may operate in conjunction with another queue (not shown), such as a best effort or aggregate queue. A best effort queue may be a queue configured to operate without regard to requirements/priorities associated with portions of the traffic, such as delay and/or jitter requirements/priorities. An aggregate queue may refer to a queue that receives traffic from a number of input sources and/or other queues and manages the received traffic via a single queue.

Scheduler 210 may include hardware and/or software for scheduling data units arriving at network device 102 and/or scheduling the egress of data units from network device 102. Scheduler 210 may operate alone or in cooperation with other scheduling devices and/or techniques, such as a hierarchical scheduler, to forward traffic according to a priority established for a class of traffic, such as voice, video, and/or data traffic. Scheduler 210 may employ aggregate rate information associated with incoming traffic flows and/or queue information to forward traffic via one or more logical interfaces.

Scheduler 210 may operate in conjunction with control unit 202, input queue 208 and/or simple shared shaper 212 to facilitate management of traffic coming into and/or going out of network device 102. For example, incoming data units may arrive at input queue 208 after being received at network device 102 via network interface 204. Incoming data units may be associated with one or more priorities. Scheduler 210 may operate on prioritized data units in conjunction with simple shared shaper 212 to make them available to a physical link via network interface 204. For example, incoming voice data units may be assigned a high priority while data units associated with still images may be assigned a lower priority. Input queue 208 may receive the prioritized incoming data units and may make them available to other devices, such as scheduler 210. Scheduler 210 may operate to empty input queue 208 based on the priorities assigned to the incoming data units.

Simple shared shaper 212 may include software and/or hardware for implementing dynamic traffic shaping of incoming and/or outgoing traffic flows. Dynamic traffic shaping may include prioritizing traffic according to determined parameters, such as delay and/or jitter, and/or low/medium/high priority, and/or may include substantially maintaining an aggregated traffic flow at a predetermined rate. Dynamic traffic shaping may facilitate efficient use and/or reuse of bandwidth associated with network interface 204. Implementations of simple shared shaper 212 may take into account the operating characteristics of other devices, such as a downstream queue, when performing dynamic traffic shaping. For example, simple shared shaper 212 may avoid overrunning the downstream queue by managing the aggregate traffic flow so as not to exceed a throughput rate associated with the downstream queue.

Simple shared shaper 212 may operate on voice, video and/or data traffic associated with input queue 208 so as to maintain an aggregated bandwidth at a determined rate. Simple shared shaper 212 may receive non-aggregated flows, such as voice, video and/or data, and may produce a shaped aggregated flow that represents a combination of the non-aggregated flows. For example, network device 102 may operate to maintain a subscriber's virtual circuit at an aggregate output bandwidth of 10 Mbits/sec. The aggregate bandwidth may be specified to maintain delay/jitter within predetermined limits for high priority traffic, such as voice traffic. This 10 Mbit/sec aggregate bandwidth may be based on an estimated traffic rate of 2 Mbits/sec for high priority voice traffic, 5 Mbits/sec for medium priority video traffic, and 3 Mbits/sec for low priority data traffic. In this example, 2 Mbits/sec, 5 Mbits/sec, and 3 Mbits/sec may represent thresholds, or upper limits, for voice traffic, video traffic, and data traffic, respectively. If voice traffic is operating below its allocated bandwidth at a rate of, for example, 0.5 Mbits/sec, simple shared shaper 212 may allocate the unused high priority bandwidth of 1.5 Mbits/sec among the other traffic flows, such as video and/or data. 1.5 Mbits/sec of voice traffic bandwidth may be dynamically re-allocated so as to maintain the aggregate traffic flow at 10 Mbits/sec on the virtual circuit.

Simple shared shaper 212 may be configured to minimize and/or eliminate overshoots that may occur if a traffic rate exceeds its threshold. Referring to the example used above, voice traffic may be 0.5 Mbits/sec when sampled at a first sampling interval. At a second sampling interval, voice traffic may have increased to 2.5 Mbits/sec. The increase in voice traffic above the 2.0 Mbit/sec threshold may be referred to as an overshoot of 0.5 Mbits/sec. In this case, simple shared shaper 212 may be configured to dynamically reallocate a portion of the video traffic to another traffic flow, such as video and/or data, in order to facilitate maintaining an aggregate traffic flow at a determined rate, such as 10 Mbits/sec.

Exemplary Method

Figure 3:
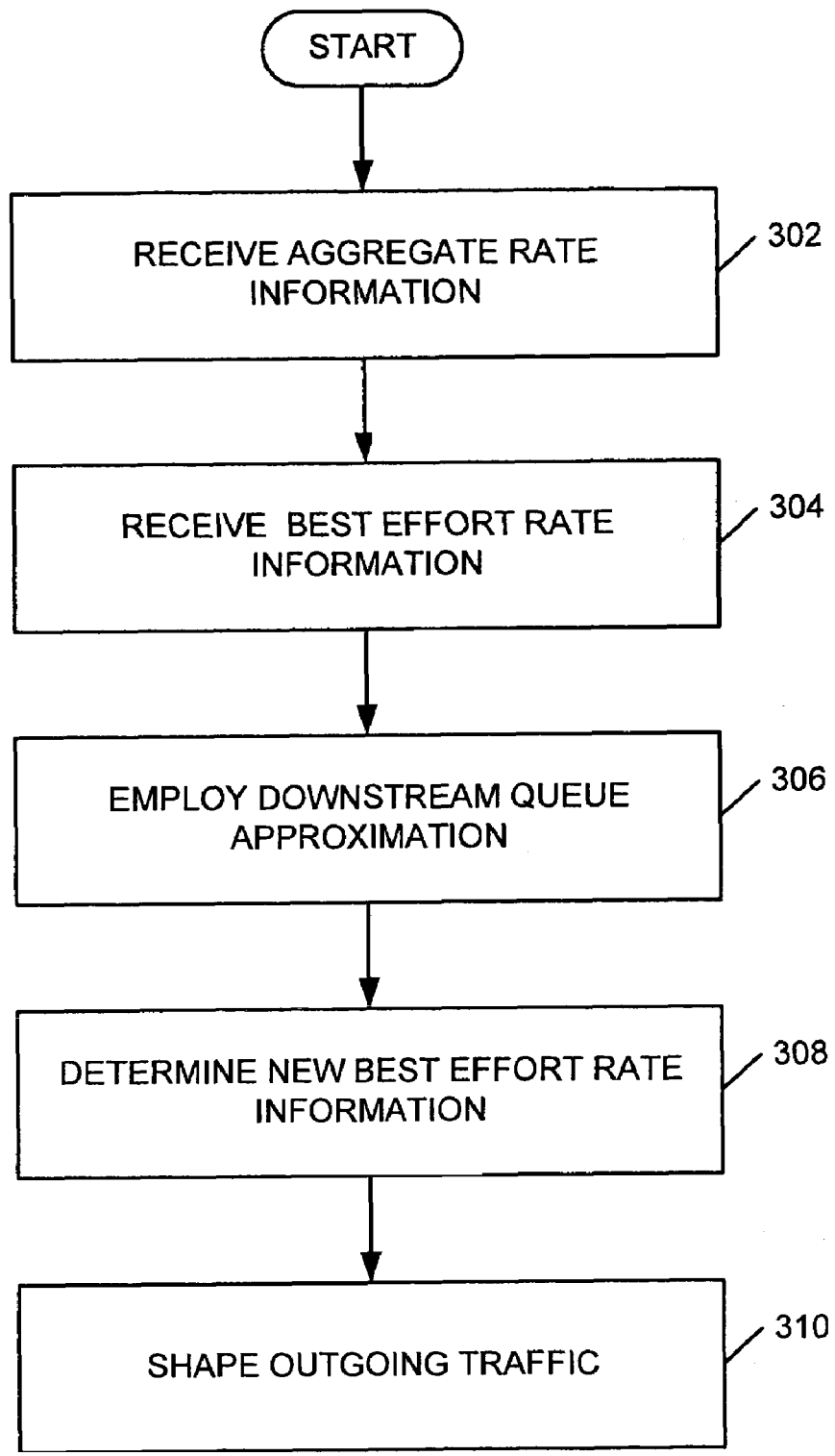
FIG. 3 is a flowchart that illustrates an exemplary method for implementing simple shared shaping consistent with principles of the invention.

FIG. 3 is a flowchart that illustrates an exemplary method for implementing simple shared shaping consistent with principles of the invention. Simple shared shaper 212 may receive aggregate rate information associated with traffic flows, such as voice, video and data traffic (act 302). The aggregate rate information may be new data obtained by sampling one or more queues, such as input queue 208, at a time, t. Aggregate rate information may be obtained at determined intervals via a sampling rate. Sampled queues may be non-best effort queues, such as those including voice and/or video traffic, and/or may be best effort queues, such as those containing data traffic.

Simple shared shaper 212 may receive best effort rate information from memory 206 (act 304). Best effort rate information may include a best effort value associated with a previous sample. For example, the output of simple shared shaper 212 for a given sampling interval may be a best effort rate. A best effort rate for a sampling interval, t, may be used as an input to simple shared shaper 212 for a subsequent sampling interval, such as interval t+1. Best effort rate information may include a representation of the actual best effort rate associated with simple shared shaper 212 at a prior sampling interval. Implementations of simple shared shaper 212 may operate with a single best effort rate value or with multiple best effort rate values. Multiple best effort rate values may be used to adjust reactivity of the shared shaper and its frequency response.

Implementations of simple shared shaper 212 may operate with downstream devices that perform scheduling and/or rate limiting functions. Simple shared shaper 212 may take a parameter, such as the performance, associated with a downstream device into account when shaping traffic flows so that a traffic flow in a queue associated with a downstream device does not exceed a threshold, such as an input traffic flow limit. Increases in queue length may lead to delay, such as a delay associated with the amount of time it takes for a data unit to go from the top of a downstream queue to the bottom of that queue, where the bottom of the downstream queue corresponds to an egress port for the queue. For example, if network device 102 operates in an ATM network, scheduler 210 and/or simple shared shaper 212 may operate with a downstream device having a queue associated therewith, such as a downstream segmentation and reassembly scheduler (SAR). It may be advantageous for simple shared shaper 212 to take the operation of the SAR into account in order to minimize the chances of overrunning the SAR queue, (i.e., filling the SAR queue faster that the queue can drain).

Simple shared shaper 212 may employ a downstream queue approximation to reduce and/or eliminate the risk of overrunning a downstream queue (act 306). An approximation may be used for the downstream queue since no actual communication, or feedback, may exist between simple shared shaper 212 and the downstream device. The downstream queue approximation may be obtained via modeling, network measurements, and/or design parameters, such as by configuring an aggregate queue on network device 102 to match a configuration of a downstream queue associated with, for example, a SAR.

Simple shared shaper 212 may process information and/or approximations to arrive at a new best effort rate value (act 308). For example, simple shared shaper 212 may use non-aggregated flows, such as voice, video and data, best effort rate information from a previous sampling interval, a downstream queue length approximation, and/or a shared shaping rate, to determine the best effort rate value. For example, a shared shaping rate may be provided to simple shared shaper 212 as a constant value.

Simple shared shaper 212 may shape outgoing traffic in a manner that minimizes and/or eliminates overshoots (act 310). For example, if a measured aggregate rate of non-best effort traffic increases from one sampling interval to another, simple shared shaper 212 may operate to reduce the available bandwidth for non-best effort traffic to minimize the chances of overshoot and/or exceeding an allocated bandwidth threshold associated with an interface. In contrast, if an available bandwidth is increasing because an aggregate traffic flow is below a threshold, simple shared shaper 212 may provision additional traffic in a manner that minimizes the potential for overshoot, such as by slightly under-provisioning the additional bandwidth.

The method described in conjunction with FIG. 3 may be implemented in software in one implementation consistent with the principles of the invention. For example, an available best effort shaping rate at a time $t_N$ may be represented as $$\hat{R}_N = \sum_{k=0}^{L} \alpha_k R_{N-k}^{(A)} + \sum_{k=1}^{L} \beta_k R_{N-k} + A_N, \quad \text{(Eq. 1)}$$

with, $$R_N = \max(\hat{R}_N, 0)$$

where $R_N$ equals a best effort shaping rate at time $t_N$, L may represent the number of samples evaluated by simple shared shaper 212, and $R_N^{(A)}$ may represent the estimated maximum available bandwidth at time $t_N$. $R_N^{(A)}$ may be characterized as the difference between the configured shared shaping rate (SSR) and the rate of all traffic flows aggregated into simple shared shaper 212, excluding best effort traffic, averaged over the previous sampling period $R_N^{(M)}$. $R_N^{(A)}$ may be represented as $$R_N^{(A)} = SSR - R_N^{(M)} \quad (Eq. 2)$$

$\alpha_k$ and $\beta_k$ may represent weights associated with prior samples. $\alpha_k$ and $\beta_k$ may be time-dependent in implementations of simple shared shaper 212 consistent with the principles of the invention. Implementations of simple shared shaper 212 may employ normalized values for $\alpha_k$ and $\beta_k$, such that $$\sum_{k=0}^{L} \alpha_k \sum_{k=1}^{L} \beta_k = 1 \quad (Eq. 3)$$

$\alpha_k$ and $\beta_k$ may be found via simulation, approximation, and/or via traffic measurements performed on network 104.

$A_N$ may represent an adjustment and/or the combination of higher-order corrections to the best effort rate and may be represented as $$A_N = \sum_{k=1}^{L} \gamma_k Q_{N-k} \quad (Eq. 4)$$

$$Q_N = \max\left(\sum_{k=-\infty}^{N} q_k, 0\right) = Q_{n-1} + \max(q_N, 0) \text{ and} \quad (Eq. 5)$$

$$q_N = \Delta t \cdot \left(R_{N-1} - R_N^{(A)}\right) \quad (Eq. 6)$$

$q_N$ may be interpreted as the excess traffic passed through simple shared shaper 212 during the time interval $(t_{N-1}, t_N)$.

Downstream queues, such as a SAR queue, may be configured to match the configured shared shaping rate associated with simple shared shaper 212 so that $Q_N$ may represent an approximation of the downstream queue depth at a time $t_N$. When this occurs, $A_N$ may be an adjustment to the best effort rate based on a current and/or historic length of the downstream queue. Since the length of a downstream queue may be proportional to latency introduced by simple shared shaper 212, $A_N$ may provide coupling of the best effort rate to latency.

An exemplary implementation of simple shared shaper 212, consistent with the principles of the invention, may be implemented with the following parameters, $L=1$, $\alpha_0=5/2$, $\alpha_1=-2$, $\beta_1=1/2$, $\gamma_1=-1/2$ Eq. 1 may be rewritten using the above parameters as $$\hat{R}_N = \frac{1}{2}\left(R_N^{(A)} + R_{N-1}\right) + 2 \cdot \left(R_N^{(A)} - R_{N-1}^{(A)}\right) - \frac{1}{2}Q_{N-1} \quad (Eq. 7)$$

where the first term of Eq. 7 may represent a mean for the new maximum possible best effort rate based on the latest measured rates through other devices and the previous best effort rate. The first term of Eq. 7 may provide shared shaping in that the best effort traffic may receive at least one half of the currently available bandwidth and the rate will be at least one half of the rate during the previous sampling period. Furthermore, the first term of Eq. 7 may provide protection against sudden changes in the available bandwidth and may dampen high frequency oscillations.

The first term of Eq. 7, operating alone, may not be sufficient to restore latency promptly if an overshoot occurs. The second and third terms of Eq. 7 may compensate to facilitate prompt restoration of latency after an overshoot. The second and third terms of Eq. 7 may further operate on short and long time scales, respectively. The second term of Eq. 7 may operate to boost the best effort rate when the available bandwidth increases, while operating to reduce the best effort rate when the available bandwidth decreases. The third term of Eq. 7 may operate to reduce the best effort rate in the event that the approximated queue length of a downstream device is non-zero.

CONCLUSION

The foregoing description describes implementations of a simple shared shaper that may be configured to shape bandwidth and/or share unused bandwidth among traffic flows having different priorities. The foregoing description of exemplary embodiments of the present invention provides illustration and description, but is not intended to be exhaustive and/or to limit the invention to the precise form disclosed. Modifications and/or variations are possible in light of the above teachings and/or may be acquired from practice of the invention. For example, configurations other than those described may be possible. For example, network device 102 may operate on more than three types of traffic, more or fewer levels and/or classes of traffic, multiple simple shared shapers may operate in series and/or in parallel, and/or simple shared shapers may operate without a downstream queue length approximation.

While series of acts have been described with regard to FIG. 3, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" as used herein is intended to mean "based, at least in part, on" unless explicitly stated otherwise.

The scope of the invention is defined by the following claims and their equivalents.

What is claimed is:

1. A network device comprising:
   a memory that stores instructions to implement a simple shared shaper to:
      receive aggregate rate information that includes rates of traffic flows for a plurality of traffic classes, where each of the traffic classes has a different quality of service requirement,
      receive a best effort rate value,
      obtain a downstream queue approximation associated with a downstream device without receiving information from the downstream device, based on an amount of traffic flow, of a particular one of the traffic classes, that exceeds an allocated bandwidth threshold for the particular traffic class, associated with the downstream device, and based on a previous queue approximation associated with the downstream device,
      determine a new best effort rate value based on the obtained downstream queue approximation, based on the received aggregate rate information, based on the received best effort rate value, and
      shape an outgoing traffic flow associated with the network device, based on the new best effort rate value, where the outgoing traffic includes the traffic flows with quality of service requirements and best effort rate traffic; and a processor, connected to the memory, where the processor executes the instructions stored in the memory.

2. The device of claim 1, where the allocated bandwidth threshold is a constant.

3. The device of claim 1, where the new best effort rate is determined by sampling the aggregate rate information.

4. The device of claim 3, where the best effort rate value represents a best effort rate associated with a prior sampling interval.

5. The device of claim 1, where the aggregate rate information is associated with a voice traffic class, a video traffic class, and a data traffic class.

6. The device of claim 1, where the processor is an application specific integrated circuit (ASIC).

7. The device of claim 1, where each of the traffic flows with quality of service requirements has an allocated bandwidth threshold associated therewith.

8. The device of claim 7, where shaping the outgoing traffic flow includes reallocating an unused portion of a first allocated bandwidth threshold associated with a first one of the traffic flows, of a first one of the traffic classes, where the reallocation allows a second one of the traffic flows, of a second one of the traffic classes, to exceed an allocated bandwidth threshold associated therewith.

9. The device of claim 8, where the second one of the traffic flows with quality of service requirements exceeds an allocated bandwidth threshold, for the one traffic flow, for a determined period of time.

10. The device of claim 1, where the traffic flows with quality of service requirements include a traffic flow having a high priority, a traffic flow having a priority lower than the high priority, and a traffic flow having a best effort priority.

11. The device of claim 1, where the traffic flows with quality of service requirements include voice traffic, video traffic, or data traffic.

12. The device of claim 1, where the new best effort rate value is determined based on an available bandwidth at a current time interval and a previous best effort rate value associated with a previous time interval multiplied by a first coefficient.

13. The device of claim 12, where the received best effort rate value is based on previous (N) best effort rate values multiplied by corresponding (N) coefficients.

14. The device of claim 13, where the (N) coefficients and the first coefficient add up to approximately one.

15. A device for shared shaping, comprising:
means for storing rate flow information about a plurality of traffic classes, at least one prior downstream queue length approximation obtained without communicating with a downstream device associated with the downstream queue, and at least one prior best effort rate value;

mean for obtaining a downstream queue length approximation associated with the downstream device, based on an amount of traffic flow, of a particular one of the traffic classes, that exceeds an allocated bandwidth threshold for the particular traffic class, associated with the downstream device, and based on the prior queue length approximation;

means for determining a new best effort rate based on the rate flow information, the downstream queue length approximation, the at least one prior downstream queue length approximation, and the at least one prior best effort rate value; and means for shaping an aggregate traffic flow that includes the plurality of traffic classes based at least in part on the new best effort rate, where the shaped aggregate traffic flow is adapted to discourage overrunning the downstream queue.

16. The shared shaper of claim 15, where the best effort rate value is associated with a best effort queue or a shared shaping rate.

17. A method performed by a network device, the method comprising:
receiving, by a processor of the network device, aggregate rate information that includes rates of traffic flows for a plurality of traffic classes, where each of the traffic classes has a different quality of service requirement;

receiving, by the processor, best effort rate information;

obtaining, by the processor, a downstream queue approximation associated with a downstream device without receiving information from the downstream device, based on an amount traffic flow, of a particular one of the traffic classes, that exceeds an allocated bandwidth threshold for the particular traffic class, associated with the downstream device, and based on a previous queue approximation associated with the downstream device;

determining, by the processor, a new best effort rate based on the obtained downstream queue approximation, the received aggregate rate information, and the received best effort rate information; and shaping, by the processor, outgoing traffic associated with the device, based on the new best effort rate, where the outgoing traffic includes the traffic flows with quality of service requirements and best effort rate traffic.

18. The method of claim 17, where the traffic flows include a voice traffic class, a video traffic class, and a data traffic class.

19. The method of claim 17, where the aggregate rate information includes an estimated available bandwidth.

20. The method of claim 19, where the estimated available bandwidth is based on a difference between a shared shaping rate and a rate of all aggregated traffic flows excluding best effort rate traffic.

* * * * *